Jan. 19, 1937.  W. H. PHILLIPS  2,068,468
FILTER
Filed March 31, 1934  3 Sheets-Sheet 1
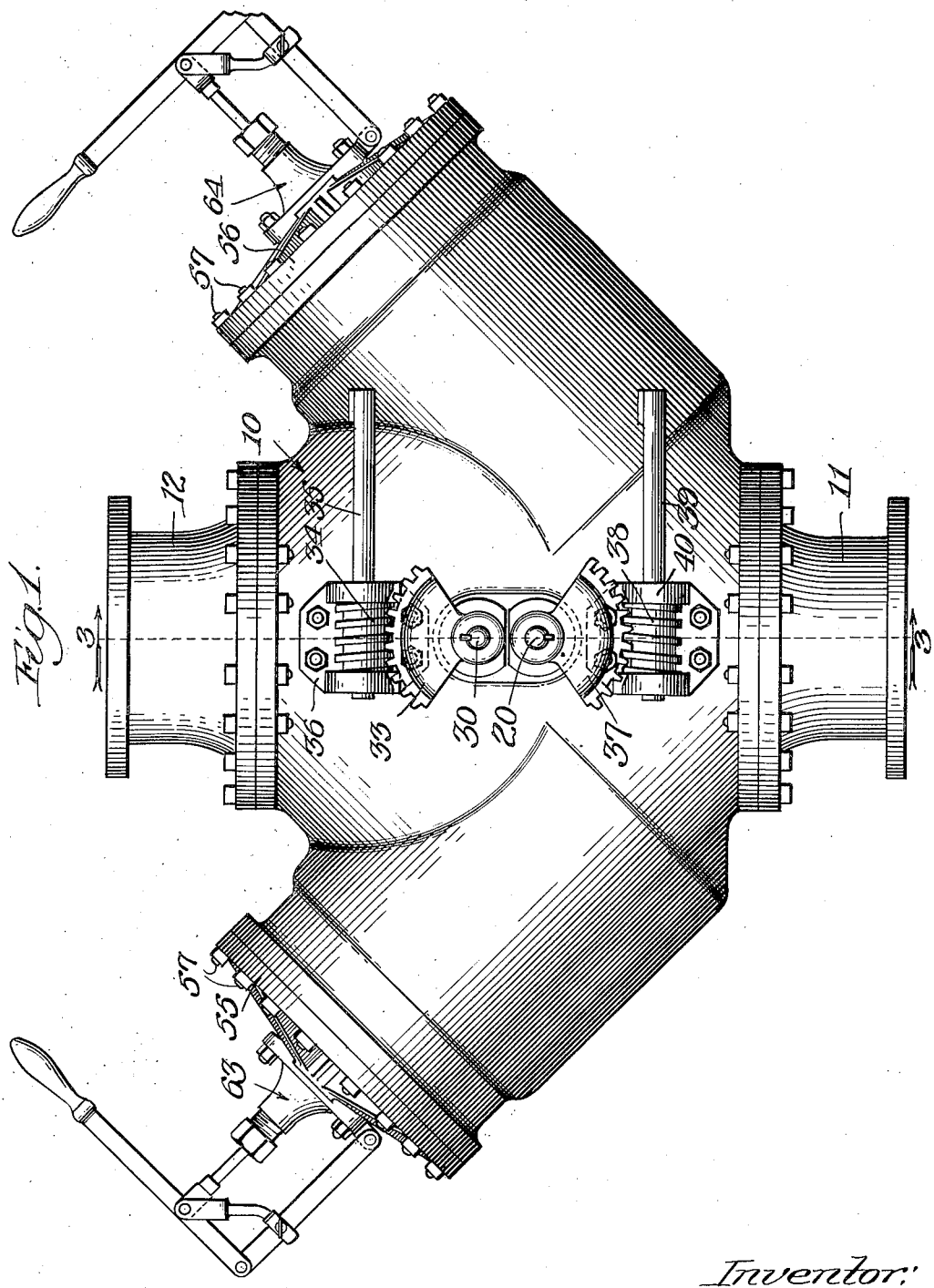
Inventor:
William H. Phillips,
By Dyrenforth, Lee, Chritton & Wiles,
Attys.

Jan. 19, 1937. W. H. PHILLIPS 2,068,468
FILTER
Filed March 31, 1934 3 Sheets-Sheet 2
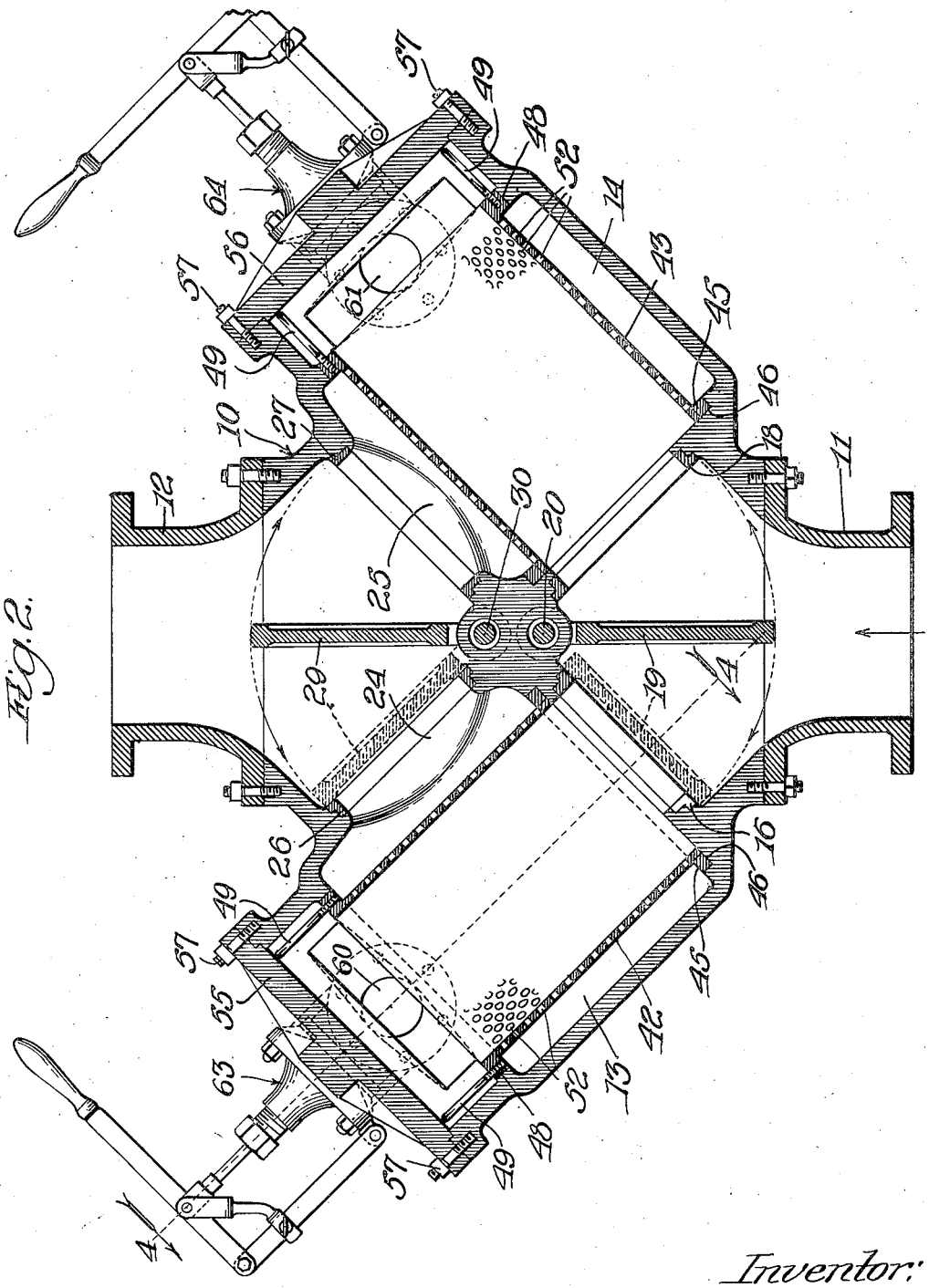

Jan. 19, 1937. W. H. PHILLIPS 2,068,468
FILTER
Filed March 31, 1934 3 Sheets-Sheet 3
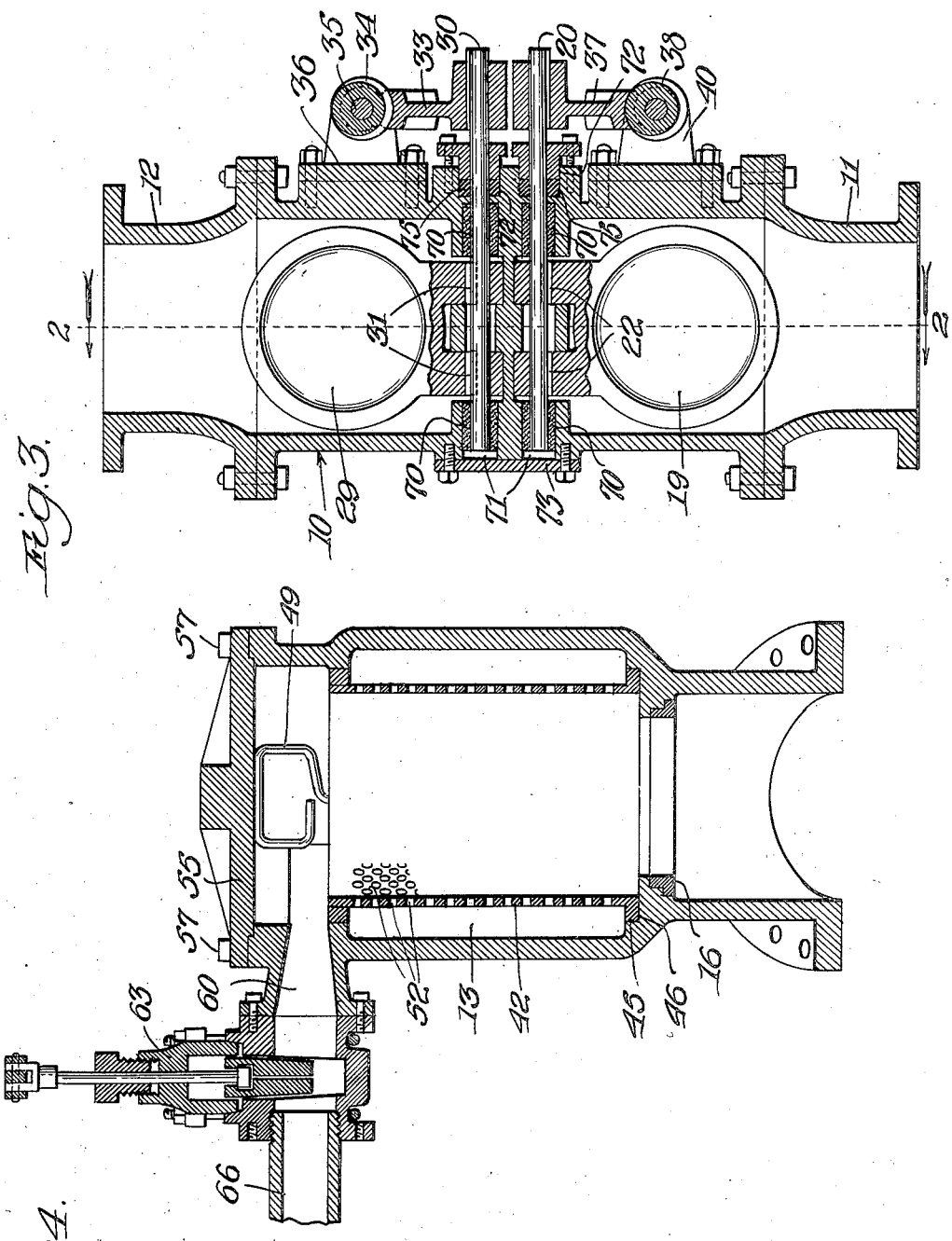
Inventor:
William H. Phillips,
By Dyrenforth, Lee, Chritton & Wiles,
Attys.

Patented Jan. 19, 1937

2,068,468

UNITED STATES PATENT OFFICE 2,068,468

FILTER

William H. Phillips, Oak Park, Ill., assignor to Henry Pratt Company, a corporation of Illinois Application March 31, 1934, Serial No. 718,497

1 Claim. (Cl. 210—168)

The invention relates to filters and is particularly adapted to be embodied in devices for filtering water which is being delivered to boilers, etc.

One form of the invention is embodied in a filter comprising a casing having an intake opening and an outlet opening. Intermediate the intake and outlet openings are two chambers in which perforate tubular members are mounted to filter the water passing through the casing. A pair of valves control the flow of the water through the tubular filtering members, the construction being such that each of these valves cooperates with each of the tubular filtering members. Associated with each filtering member is a quick opening valve which is opened to discharge the water from the casing when the associated tubular filtering member is being cleaned while it remains in place in the casing. The first-mentioned valves are keyed to shafts which are rotatably journaled in rubber sleeves so that the valves may seat tightly on the valve seats provided for them.

The construction of the improved filtering device is such that the direction of the flow of water through either of the tubular filtering members may be reversed to clean the filtering member. Also, the valves first mentioned above may be manipulated to shut off the flow of water through either of the tubular filtering members so that it may be removed for repair or cleaning purposes.

Other advantages of the invention will become apparent as the following detailed description progresses, reference being had to the accompanying drawings, wherein—

Fig. 1 is a side view of a filtering device which embodies the invention.

Fig. 2 is a section taken on line 2—2 of Fig. 3.

Fig. 3 is a section taken on line 3—3 of Fig. 1, and

Fig. 4 is a section taken on line 4—4 of Fig. 2.

Referring to the drawings wherein a preferred form of the invention is illustrated, the reference character 10 designates a casing to which tubular fittings 11 and 12 are secured, the tubular fittings 11 and 12 being the intake and outlet openings, respectively, of the casing 10.

The casing 10 is provided with approximately cylindrical chambers 13 and 14, the longitudinal axes of the chambers 13 and 14 being preferably disposed at angles to the horizontal and the vertical. Valve seats 16 and 18 are mounted in the casing 10 at the lower ends of the chambers 13 and 14, respectively, the valve seats 16 and 18 being engageable by a valve disc 19 keyed to a shaft 20 by keys 22 (Figs. 2 and 3). The chambers 13 and 14 are provided with lateral openings 24 and 25, respectively, through which water may flow from the chambers 13 and 14, respectively, to the tubular fitting 12. It may be mentioned that when it is so desired, the direction of the flow of the water through the openings 24 and 25 may be reversed.

Disposed in the openings 24 and 25 are valve seats 26 and 27, respectively, which are engageable by a valve disc 29 which is keyed to a shaft 30 by keys 31. The means for controlling the shaft 30 preferably comprises a worm gear segment 33 keyed to the shaft 30 and meshing with a worm 34 fixed to a shaft 35 which has one end rotatably journaled in a bearing bracket 36 secured to the casing 10 (Fig. 1).

The means for controlling the shaft 20 preferably comprises a worm gear segment 37 keyed to the shaft 20 and meshing with a worm 38 fixed to a shaft 39, one end of the shaft 39 being rotatably journaled in a bearing bracket 40 fixed to the casing 10.

Any suitable means such as a hand wheel (not shown) may be employed to rotate the shafts 35 and 39. If it is so desired, these shafts may be driven by power operated means (not shown).

Obviously, the shafts 35 and 39 may be rotated to have the valve discs 19 and 29 seat on either of their associated valve seats or the valve discs 19 and 29 may be brought into the intermediate positions wherein they are shown in full lines in Fig. 2.

Disposed in the chambers 13 and 14 are tubular filtering members 42 and 43, respectively, the lower ends of the filtering members 42 and 43 being secured to rings 45 which seat upon annular shoulders 46 formed in the casing 10 at the lower ends of the chambers 13 and 14. The upper ends of the tubular filtering members 42 and 43 have rings 48 secured thereto. Screw-threaded into each of the rings 48 is a plurality of handle members 49 which are formed from bent rods and are somewhat resilient for a purpose which will presently appear.

The tubular filtering members 42 and 43 are preferably formed from metal and are perforated as indicated at 52.

The upper ends of the chambers 13 and 14 are closed by heads 55 and 56, respectively, which are secured to the casing 10 by bolts 57.

The chambers 13 and 14 are provided at their upper ends with discharge ports 60 and 61, respectively, (Figs. 2 and 4). Bolted to the casing 10 at the outer ends of the ports 60 and 61 are quick opening valves 63 and 64, respectively.

The quick opening valves 63 and 64 are of well known construction and need not be described in detail. The valves 63 and 64 are connected by pipes 66, or the equivalent, to a drain, or the equivalent.

It may be readily understood that if the heads 55 and 56 are removed from the casing 10, the tubular filtering members 42 and 43 may be removed from the chambers 13 and 14, respectively, by pulling upon the handle members 49. When the heads 55 and 56 are in place upon the casing 10, they bear upon the handle members 49 and exert sufficient force upon them to insure that the rings 45 at the lower ends of the tubular filtering members 42 and 43 will seat firmly on the annular shoulders 46. It is for this purpose that the handle members 49 are somewhat resilient.

The shafts 20 and 30 are rotatably journaled in rubber sleeves 70 mounted in bores 71 and 72 provided in the casing 10 (Fig. 3). The outer ends of the bores 71 are closed by a disc 73 which is secured to the casing 10 by bolts 74. Packing 75 of well known construction closes the outer ends of the bores 72.

The operation of the improved filter is substantially as follows: When the filter is functioning in a normal manner, the valve discs 19 and 29 are disposed substantially in the positions in which they are shown in full lines in Fig. 2, the quick opening valves 63 and 64 being closed. The water to be filtered enters through the tubular fitting 11 and thence through the perforations of the tubular filtering members 42 and 43 to the openings 24 and 25 to be discharged through the tubular fitting member 12. Any solids of any appreciable size in the water is filtered out by the tubular filtering members 42 and 43, the size of the perforations 52 in the tubular filtering members being appropriate for the size of solid matter it is desired to filter out of the water.

If one of the tubular filtering members, such as for instance the tubular filtering member 42, is to be cleaned while it remains in place in the chamber 13, the shaft 20 is rotated through the medium of the shaft 39, the worm 40 and the worm gear segment 37 until the valve disc 19 seats upon the valve seat 16. The quick opening valve 63 is then opened and the water entering the tubular member 11 passes through the tubular filtering member 43 and part of the water then passes through the tubular fitting 12 and another part of the water flows through the opening 24 and thence through the perforations of the tubular filtering member 42 into the tubular filtering member 42. This water is discharged through the valve 63. It will be noted that the direction of flow through the perforations of the tubular filtering member 42 is reversed during this operation and that any solids which have been filtered out of the water previously will be discharged through the valve 63.

It will be readily understood that the tubular filtering member 43 may be cleaned in a similar manner by seating the valve disc 19 on the valve seat 18 and opening the valve 64.

If it is desired to repair or remove one of the tubular filtering members, such as for instance the tubular filtering member 42, the valve disc 19 is seated on the valve seat 16 and the valve disc 29 is seated on the valve seat 26. The water flowing through the casing 12 will then be filtered by the tubular filtering member 43 and there will be no pressure in the chamber 13. Head 55 may then be removed from the casing 10 after which the tubular filtering member 42 may be cleaned, repaired or replaced if it is so desired.

Obviously, access may be had to the tubular filtering member 43 if the valve disc 19 is seated upon the valve seat 18 and the valve disc 29 is seated upon the valve seat 27.

It will be noted that the valve discs 19 and 29 are controlled independently of each other. This construction permits the filter to operate while one or the other of the tubular filtering members 42 and 43 is being cleaned, repaired or replaced.

As stated above, a feature of the invention is the resilient bushings or sleeves 70 which rotatably journal the shafts 20 and 30. The sleeves 70 yield when the valve discs 19 and 29 are urged against their respective valve seats and permit the valve discs to make fluid-tight seals on their seats.

While I have shown and described certain embodiments of my invention, it is to be understood that it is capable of many modifications. Changes, therefore in the construction and arrangement may be made without departing from the spirit and scope of the invention as disclosed in the appended claim, in which it is my intention to claim all novelty inherent in my invention as broadly as possible, in view of the prior art.

I claim:

A filter device comprising a casing having an inlet and an outlet, chambers in said casing communicating with said outlet, filtering members disposed within said chambers, said filtering members having their ends adjacent the inlet open and in communication with the inlet, structure within the casing closing the same adjacent the filter ends of the filtering members so that the only communication between the inlet and outlet is through the filtering members, valve means operable to cut off communication between either of the filtering members and the inlet to the casing, and normally closed means for each chamber operable for the discharge of backwash fluid flowing through the walls of the filtering members.

WILLIAM H. PHILLIPS.